3,078,149
METHOD OF PRODUCING TITANIUM MONOXIDE OR TITANIUM CARBIDE

William A. Barber, Springdale, Conn., assignor to American Cyanamid Company, New York, N.Y., a corporation of Maine
No Drawing. Filed Feb. 1, 1962, Ser. No. 170,524
7 Claims. (Cl. 23—202)

This invention relates to a new and improved method of producing at least one member of the group consisting of titanium monoxide and titanium carbide. More particularly it is concerned with the production of such titanium compound or compounds from titanium dioxide using a particular kind of reaction medium or composition having calcium carbide dissolved therein. The calcium carbide functions as a reducing agent in reducing the titanium dioxide to titanium monoxide and/or titanium carbide.

The reaction medium which is used in practicing the present invention is a solution of calcium carbide dissolved in a molten solvent which is non-reactive with the said carbide during and after dissolution thereof and which consists essentially of at least one member of the group consisting of the anhydrous molten lithium halides and the anhydrous molten halides of the alkaline-earth metals (i.e., calcium, strontium, barium). Thus, there can be used anhydrous (substantially completely anhydrous) molten lithium fluoride, chloride, bromide or iodide, as well as anhydrous calcium, strontium or barium fluoride, chloride, bromide or iodide. Mixtures of any two or more or all of these halides may be used, as desired or as conditions may require. In general, the amount of dissolved calcium carbide per 100 parts of the resulting solution (i.e., calcium carbide plus molten halide) is up to about 50%, more particularly from about 1% to about 50%, by weight of the solution.

Titanium carbide is generally prepared by reducing titanium dioxide with carbon at temperatures of 1200° C. and upwards (up to 1900° C. in order to complete the reduction). It also can be made by reacting titanium metal with carbon in a molten metal solution of, for example, iron or nickel. Such methods require very high temperatures and/or involve heterogeneous reactions of two solid reactants. They have the inherent disadvantage of proceeding very slowly.

Titanium monoxide has been produced by a number of different methods, all of which are characterized by having one or another undesirable feature. It can be prepared, for example, by heating titanium metal with titanium dioxide at 1550°–1750° C. in vacuo. This method requires a high temperature and involves a heterogenous reaction, both of which are undesirable features if a process is to be both economical and efficient. Another method of preparing titanium monoxide is to heat TiC mixed with CaO, ZnO or MgO at 1500° C. in vacuo. This method involves the sublimation or distillation of by-product active metal such as calcium, zinc or magnesium and can be a hazardous operation.

It was known prior to this invention that calcium carbide is a reducing agent; also, that a surface layer of oxide is normally present on calcium carbide, and that this oxide layer adversely affects its chemical reactivity, e.g., as a reducing agent or in other chemical reactions.

The present invention is a solution to the problem of providing a simple and economical means whereby calcium carbide can be used as a reducing agent and, more particularly, in reducing titanium dioxide ($TiO_2$) to titanium monoxide (TiO) and/or titanium carbide (TiC).

In practicing the present invention any of several different ways can be used in bringing the titanium dioxide, calcium carbide and molten or fused halide into intimate contact with each other. For example, one can first prepare a solution by melting the halide solvent and then add the carbide and titanium dioxide thereto in either order or together; or, one can first mix the solid carbide and solid halide, and then heat the mixture to a temperature sufficiently high to melt the halide solvent and to dissolve the carbide in the molten mass after which the titanium dioxide is added thereto. A more specific example is to suspend titanium dioxide in the molten halide, add the solid calcium carbide thereto, and then agitate the resulting mixture heated to a temperature of from 400° C. to 1000° C., more particularly less than 1000° C. and specifically 975° C. for a prolonged period sufficient to produce an optimum yield of the desired titanium compound (TiO and/or TiC).

One convenient method involves first dissolving the calcium carbide (in lump, pellet, finely-divided or other suitable form) in one or more anhydrous molten (fused) halides of the kind used in practicing this invention, namely, a lithium halide or a molten halide of calcium, strontium or barium (alkaline-earth metals), or in mixtures of one or more of each of the said classes of halides in any proportions, e.g., 0.1 to 99.9 mole percent of the one halide to 99.9 to 0.1 mole percent of the other.

The calcium carbide dissolves in the aforementioned molten halides to yield homogeneous solutions as evidenced by, for example, the lowering of the melting point of the solvent halide employed, the visual homogeneity of the frozen melt, and the uniformity (within the limits of experimental error) of analytical results from different portions of the product.

At atmospheric pressure, the temperatures used in dissolving the calcium carbide in the halide can be varied from the melting point of the solvent halide (or mixture thereof with an additive or effect agent) to the point at which the mixture or solvent halide alone volatilizes. For example, the temperature at which dissolution is effected at atmospheric pressure may be as low as 350° C. (in the case of a mixture of salt and effect agent) to 2200° C., depending, for example, upon the particular salt or mixture of salts employed. Dissolution temperatures should not be so high as to cause decomposition of the calcium carbide or of the salt (or mixture thereof with an additive) that is used. The optimum temperature employed for making the solutions depends, for example, upon the metallic halide used and the subsequent purpose for which the solution is to be employed, which, in this invention, is for the purpose of producing TiO and/or TiC from $TiO_2$.

The amount of carbide that dissolves per 100 parts by weight of the resulting solution varies, for example, from about 1% to about 50%, or more, of the solution. This amount depends, for instance, upon the particular solvent halide employed, the temperature at which the solution is made, and whether or not dissolution has been permitted to continue to equilibrium state. Dissolution should be effected in an inert atmosphere, e.g., an atmosphere of argon, helium, krypton, etc.

The dissolution of the calcium carbide in the molten halide is an equilibrium process. Hence, in some cases the approach to equilibrium conditions can be accelerated by incorporating a suitable additive that will effect this result. For optimum results the additive should be substantially non-reactive with the titanium dioxide, calcium carbide and the reaction product or products, viz., TiO and/or TiC.

The additive may be a fluxing agent. Sodium and potassium halides, for instance the chlorides, are examples of additives which act as a flux and lower the temperature at which dissolution of the carbide in the molten halide takes place. (Parenthetically it might here be mentioned that sodium and potassium halides, specifically the chlorides, are non-operative as solvents for calcium carbide; that is, calcium carbide will not dissolve in the aforementioned halides, in molten state, in any measurable amount.)

The additive also can be a stabilizer for the solution; or an antioxidant or oxygen scavenger; or an inhibitor of any sort of action that would or might detrimentally affect the solution or the reaction mass; or a scavenger of water. The amount of such additive may be varied as desired or as conditions may require. For example, the additive may be a minor mole percent (less than 50 mole percent, e.g., from 0.0001% to 49.9 mole percent) of the total molar amount of additive plus solvent halide. Thus the additive, e.g., antioxidant, inhibitor, stabilizer, scavenger, etc., may comprise from 0.001% to 4 or 5% by weight of the calcium carbide dissolved in the molten halide.

It has been indicated hereinbefore that the lithium halide and/or alkaline-earth metal halide should be substantially completely anhydrous. By "substantially completely anhydrous" or "anhydrous" alone, as used herein and in the appended claims with reference to the metallic halide, is meant a halide of the kind specified that contains no more than a trace of water. Higher percentages may be present in the starting halide, but nearly all, if not all, of this water in free or combined state will be driven off from the halide prior to the addition of the calcium carbide and/or the titanium dioxide thereto. Hence the molten halide, which is the solvent for the calcium carbide, is and should be substantially completely anhydrous, that is, substantially free of water. This is because water reacts with calcium carbide.

The vessel in which dissolution of the calcium carbide is effected, and/or the reaction to produce TiO and/or TiC is carried out, should have at least its inner surface composed of a material which is resistant to attack by the molten mass; or, if slightly attacked, does not evolve products which would adversely affect the dissolution of the carbide in the molten halide, or adversely affect the properties of the molten solution containing the dissolved carbide and/or the course of the reaction to produce TiO and/or TiC. Examples of materials that are satisfactory for forming the vessel (or inner liner thereof) in which dissolution and/or the reaction are effected are the various stainless steels. Construction materials for the vessel obviously should be chosen among those that do not melt below the temperature at which the carbide is dissolved in the molten halide. Especially for commercial operations it is generally desirable that the reaction vessel be provided with suitable agitating means. For large or small operations agitation also may be provided by injecting a stream of an inert gas into the reaction mass. Of course, suitable means also should be provided for heating the reaction mass and for maintaining it at the desired reaction temperature, viz., from 400° C. to 1000° C.

The time of the reaction may be varied as desired or as may be required in order to obtain an optimum yield of the desired product, viz., TiO and/or TiC, but is generally within the range of from ½ to 24 hours or longer depending, for example, upon the size of the particular batch.

The proportions of $TiO_2$ and $CaC_2$ may be considerably varied, e.g., from stoichiometrical proportions to any molar excess of $CaC_2$ that may be desired or may be required in order to obtain the desired product or products (TiO and/or TiC) in an optimum yield of either or both. Preferably the $CaC_2$ is employed in excess of stoichiometrical proportions, e.g., from 1 mole percent to 100 or 200 mole percent in excess, or higher. When an optimum yield of TiO is sought, it is generally desirable to use more $CaC_2$ by weight than $TiO_2$ but less (e.g., from 5% to 30% less) than twice the weight of $TiO_2$ used. When an optimum yield of TiC is sought, then it is generally desirable to use $CaC_2$ in an amount by weight which is at least twice, and preferably more than twice (e.g., from 2.1 times to 3 or 4 or more times) the weight of $TiO_2$ employed.

When one seeks to obtain an optimum yield of titanium monoxide, it is generally desirable that the reaction be carried out at a temperature within the range of from 615° C. to 850° C.; and when one wants to obtain an optimum yield of titanium carbide, it is generally desirable that the reaction temperature be within the range of 900° C. to 1000° C.

If desired, products of the method (TiO or TiC) can be separated from the reaction mass by washing the mass with water or other solvent until it is free of the halide salt used as a solvent medium in which the reaction was carried out. The resulting isolated material is then dried.

Products comprised predominantly of TiO with a relatively small or minor amount of TiC are useful, for example, in applications where TiO normally finds utility, e.g., in semi-conducting applications. Similarly, products comprised predominantly of TiC with a relatively small or minor proportion of TiO are useful, for example, in applications where TiC normally finds utility, e.g., cutting tools and abrasive articles.

In general, the conditions of reaction, e.g., proportions of $TiO_2$ and $CaC_2$, time and temperature of reaction, etc., are controlled so as to produce the optimum amount of solely TiO or TiC rather than to produce mixtures of TiO and TiC, especially mixtures wherein TiO and TiC are present in approximately the same amount. If samples taken from the reaction mass during the course of the reaction indicate that relatively high amounts of TiO and TiC are each present, usually the reaction is then continued (adding more $CaC_2$ if necessary) in order to reduce the TiO to TiC and thereby obtain an optimum yield of TiC.

Our invention provides an inexpensive method of producing TiO and/or TiC using readily available materials including $TiO_2$ and a solid reducing agent, $CaC_2$, which is relatively inexpensive. By using one or more of the aforementioned anhydrous molten halides as a solvent for the calcium carbide, the latter can be used effectively and efficiently as a reducing agent since it does not have the surface layer of oxide which is normally present thereon and which, if present, adversely affects its reactivity. Furthermore, the calcium carbide can be substantially uniformly dissolved in the molten halide thereby further aiding in the efficiency of the reaction.

In order that those skilled in the art may better understand how the present invention can be carried into effect, the following examples are given by way of illustration and not by way of limitation. All parts and percentages are by weight unless otherwise indicated.

*Example 1*

About 4 parts of titanium dioxide ($TiO_2$) is added to 45 parts of a solution of 6.75 parts of calcium carbide in 38.25 parts molten lithium chloride. The mixture is held at 820° C. for 2½ hours. At the end of this time the molten salt is removed by high temperature filtration leaving a deep blue-black solid which gives an X-ray pattern consistent with titanium monoxide, TiO.

*Example 2*

About 5 parts of $TiO_2$ is mixed with 10 parts of $CaC_2$ and 10 parts of LiF and held at 950° C. for three hours. The $CaC_2$ reduces the $TiO_2$ to titanium carbide (TiC) which is identified by X-ray analysis.

*Example 3*

Same as Example 2 except that molten lithium chloride (15 parts) is used as solvent and the mixture is held at 950° C. for 2½ hours. The reaction mass is washed free of LiCl with $H_2O$, and the resulting grey solid is identified by X-ray analysis as being predominantly TiC. The X-ray examination fails to indicate the presence of TiO or Ti metal, but some unidentified products in a small amount are indicated by certain bands.

*Example 4*

A solution of calcium carbide in molten anhydrous lithium chloride is first prepared as follows:

Approximately 1 part by weight of ¼" lumps of commercial calcium carbide and approximately 3 parts by weight of anhydrous lithium chloride are placed in a vertical, stainless steel tube supported by a coarse-porosity, stainless steel disc welded into the tube. Suitable attachments are used to exclude air and to keep a rapid stream of dry, inert gas (e.g., argon, helium, etc.), passing up through the tube. The tube and contents are then heated electrically to 820° C. (as measured by a Chromel-Alumel thermocouple) and held at this temperature for 2 to 3 hours. The stream of dry, inert gas, specifically argon, is passed through at sufficient pressure to keep the molten solution above the porous metal disc. At the end of this time, the molten solution is discharged by releasing the pressure and then applying downward pressure of argon to the top of the tube to force the liquid through. The molten solution falls through a drip cone to a cool receiver where it solidifies to a gray solid which contains calcium carbide. Analysis of this material by precipitation of cuprous acetylide with ammoniacal Cu+ solution gives approximately 17 weight percent calcium carbide. The presence of this carbide lowers the melting point of the solvent lithium chloride which is evidence for a true solution, as is the visual homogeneity of the frozen melt and the consistency of analytical results from several portions of the product. The product shows much sharper lines for $CaC_2$ in its X-ray powder pattern than the starting carbide product, indicating an increase of crystallinity. There is no evidence of formation of lithium metal.

To 4 parts of the above-described solution containing 17% of calcium carbide dissolved in molten anhydrous lithium chloride is added 0.6 part of finely-divided $TiO_2$ and the mixture is heated with agitation for 3½ hours at about 770° C. under an atmosphere of argon. The cold reaction mass is washed with water until freed of LiCl. The resulting solid is found by X-ray analysis to be mainly TiO.

*Example 5*

A solution of calcium carbide in molten halide is first prepared as described under Example 4 with the exception that approximately 10 parts by weight of commercial calcium carbide is mixed wtih 40 parts by weight of anhydrous calcium chloride and the mixture is held at 830° C. for 3 hours. The resulting solution contains approximately 5.7 weight percent calcium carbide. To 50 parts of this solution is added 1.0 part of finely-divided $TiO_2$ and the mixture is heated with agitation for 5 hours at about 900° C. under an atmosphere of argon. The cold reaction mass is washed free of calcium chloride with water. X-ray examination of a sample of the resulting solid establishes that the titanium present therein is almost solely in the form of TiC.

*Example 6*

A solution of calcium carbide in a solvent halide composition is first prepared as described under Example 4 with the exception that approximately 1 part commercial calcium carbide is used with 15 parts of an anhydrous mixture of lithium chloride and potassium chloride containing 70 mole percent lithium chloride and 30 mole percent potassium chloride. This mixture of calcium carbide and salt is held at about 570° C. for 30 minutes, and the resulting solution contains about 1.0 weight percent calcium carbide. (The advantage of using an additive such as KCl is that it reduces the temperature at which dissolution can be effected.)

To 16 parts of the above-described solution is added 0.15 part of finely-divided $TiO_2$, and the mixture is heated with agitation for 5 hours at about 660° C. under an argon atmosphere. After washing out the lithium chloride and potassium chloride with water, the resulting solid is found by X-ray analysis to be predominantly TiO.

*Example 7*

A solution of calcium carbide in molten halides is first prepared as described under Example 4 with the exception that approximately 1 part commercial calcium carbide is used with 2 parts of an anhydrous eutectic mixture of lithium chloride and lithium fluoride containing 70 mole percent lithium chloride and 30 mole percent lithium fluoride. This mixture of calcium carbide and said salts is heated to 820° C. for 1 hour and then held at 550° C. for 2 hours. The resulting solution contains approximately 11 weight percent calcium carbide.

To 3 parts of the solution produced as above-described is added 0.1 part of finely-divided $TiO_2$ and the mixture is heated with agitation for 5 hours at about 900° C. under an atmosphere of argon. X-ray examination of a sample of the solid reaction mass establishes that the $TiO_2$ has been reduced by the $CaC_2$ almost completely to TiC.

*Example 8*

A solution of calcium carbide in molten halide is first prepared as described under Example 4 with the exception that approximately 10 parts by weight of commercial calcium carbide is mixed with 40 parts by weight of anhydrous lithium bromide and the mixture is held at 820° C. for 3 hours. A Nichrome screen is used here to cover the carbide lumps and keep them below the surface of the denser, molten bromide. The resulting solution contains approximately 6 weight percent calcium carbide. To 50 parts of this solution is added 1 part of finely-divided $TiO_2$ and the mixture is heated with agitation for 3 hours at about 840° C. under an atmosphere of argon. The solid reaction mass is washed free of lithium bromide with water. X-ray examination of a sample of the resulting solid establishes the presence of both TiO and TiC.

*Example 9*

A solution of calcium carbide in molten halide is first prepared as described under Example 4 with the exception that approximately 10 parts commercial calcium carbide and 40 parts anhydrous barium chloride are held at 1000° C. for 2½ hours. The resulting solution contains approximately 4.5 weight percent calcium carbide. To 50 parts of this solution is added 2 parts of finely-divided $TiO_2$, and the mixture is heated with agitation for 5½ hours at 975° C. under an argon atmosphere. The barium chloride is water-washed from the solid reaction mass. X-ray examination of a sample of the salt-free solid shows that the titanium is present therein almost solely in the form of TiC.

In copending application Serial No. 843,076, filed September 29, 1959, of William A. Barber and Carol L. Sloan, which application is assigned to the same assignee as the present invention, claims are made to solutions of certain carbides (including calcium carbide) dissolved in molten halides of the kind used in practicing the present invention. The aforesaid application Serial No. 843,076 has now matured into Patent No. 3,031,413, dated April 24, 1962.

I claim:

1. The method of producing at least one member of the group consisting of titanium monoxide and titanium carbide which comprises heating titanium dioxide, at a temperature within the range of from 400° C. to 1000° C., in a composition which is a solution of calcium carbide dissolved in a molten solvent which is non-reactive with the said carbide during and after dissolution thereof and which consists essentially of at least one member of the group consisting of the anhydrous molten lithium halides and the anhydrous molten halides of the alkaline-earth metals (calcium, strontium, barium), the amount of dissolved calcium carbide per 100 parts by weight of the resulting solution being up to about 50% by weight of the solution; and continuing to heat the said titanium dioxide in the said composition within the aforesaid temperature range until titanium dioxide has been converted into at least one member of the group consisting of titanium monoxide and titanium carbide.

2. A method as in claim 1 wherein the molten solvent is anhydrous molten lithium chloride.

3. A method is in claim 1 wherein the molten solvent is anhydrous molten lithium fluoride.

4. The method of producing titanium monoxide which comprises heating titanium dioxide, at a temperature within the range of from 615° C. to 850° C., in a composition which is a solution of calcium carbide dissolved in anhydrous molten lithium chloride, the amount of dissolved calcium carbide per 100 parts by weight of the resulting solution being from about 1% to about 50% by weight of the solution; and continuing to heat the said titanium dioxide in the said composition within the aforesaid temperature range until the titanium dioxide has been converted into an optimum yield of titanium monoxide.

5. A method as in claim 4 wherein the amount of calcium carbide employed is, by weight, more than that of the amount of titanium dioxide used but is less than twice that of the latter.

6. The method of producing titanium carbide which comprises heating titanium dioxide, at a temperature within the range of from 900° C. to 1000° C., in a composition which is a solution of calcium carbide dissolved in anhydrous molten lithium chloride, the amount of dissolved calcium carbide per 100 parts by weight of the resulting solution being from about 1% to about 50% by weight of the solution; and continuing to heat the said titanium dioxide in the said composition within the aforesaid temperature range until the titanium dioxide has been converted into an optimum yield of titanium carbide.

7. A method as in claim 6 wherein the amount of calcium carbide employed is, by weight, at least twice that of the amount of titanium dioxide used.

References Cited in the file of this patent

UNITED STATES PATENTS 3,012,857   Pease _____ Dec. 12, 1961

OTHER REFERENCES

Ser. No. 292,742, Beck (A.P.C.), published July 13, 1943.

J. W. Barksdale book, Titanium, 1949 Edition, page 94. The Ronald Press Co., New York.